United States Patent
Sowards et al.

(10) Patent No.: US 8,960,358 B2
(45) Date of Patent: Feb. 24, 2015

(54) SPEED-BASED HYDRAULIC PUMP CONTROL SYSTEM AND METHOD FOR NOISE REDUCTION IN HYBRID VEHICLES

(71) Applicant: Robert Bosch GmbH, Stuttgart (DE)

(72) Inventors: Michael Sowards, Clarkston, MI (US); Brian Leslie, Rochester Hills, MI (US); Frank Kachinski, Taylor, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/067,060

(22) Filed: Oct. 30, 2013

(65) Prior Publication Data

US 2015/0004002 A1    Jan. 1, 2015

Related U.S. Application Data

(60) Provisional application No. 61/839,968, filed on Jun. 27, 2013.

(51) Int. Cl.
*B60K 5/00*    (2006.01)
*F04B 49/20*    (2006.01)

(52) U.S. Cl.
CPC ..................... *F04B 49/20* (2013.01)
USPC ............................ 180/301; 180/302; 180/305

(58) Field of Classification Search
USPC .......... 180/305, 301, 302, 307; 701/1, 50, 70; 60/399, 436, 406
See application file for complete search history.

(56) References Cited

U.S. PATENT DOCUMENTS

| | | | |
|---|---|---|---|
| 7,055,643 B2 * | 6/2006 | Williams et al. | 180/421 |
| 8,393,151 B2 * | 3/2013 | Cho | 60/452 |
| 2011/0308878 A1 | 12/2011 | Shirao | |

FOREIGN PATENT DOCUMENTS

| | | |
|---|---|---|
| CN | 101504072 | 8/2009 |
| EP | 0453919 | 10/1991 |
| EP | 0962378 | 12/1999 |
| EP | 2119943 | 11/2009 |
| GB | 2415757 | 1/2006 |
| JP | 2011195102 | 10/2011 |
| WO | 9533629 | 12/1995 |
| WO | 9847732 | 10/1998 |
| WO | 2011090165 | 7/2011 |

OTHER PUBLICATIONS

International Search Report and Written Opinion for Application No. PCT/US2014/044253 dated Oct. 23, 2014 (9 pages).

* cited by examiner

*Primary Examiner* — John Walters
*Assistant Examiner* — James Triggs
(74) *Attorney, Agent, or Firm* — Michael Best & Friedrich LLP

(57) ABSTRACT

A speed-based system for controlling a pump displacement to control a pump flow rate of a hydraulic pump in a vehicle, such as a hybrid. The system includes a plurality of sensors, a controller, and a hydraulic pump. The controller is configured to receive data from the sensors, ascertain a speed of the vehicle, determine a target pump displacement, and transmit the target pump displacement. The target pump displacement is less than a predetermined maximum value when the speed of the vehicle is greater than a first predefined threshold, and equal to the predetermined maximum value when the speed of the vehicle is less than or equal to the first predefined threshold. The hydraulic pump is configured to ascertain an actual pump displacement, receive the target pump displacement from the controller, and alter the actual pump displacement to the target pump displacement.

16 Claims, 6 Drawing Sheets

SPEED-BASED HYDRAULIC PUMP CONTROL SYSTEM AND METHOD FOR NOISE REDUCTION IN HYBRID VEHICLES

RELATED APPLICATIONS

This application claims priority to U.S. Provisional Application No. 61/839,968, filed on Jun. 27, 2013 and titled "SPEED-BASED HYDRAULIC PUMP CONTROL SYSTEM AND METHOD FOR A HYBRID VEHICLE," the entire contents of which is incorporated by reference.

BACKGROUND

The present invention relates to hydraulic hybrid vehicle systems. Hydraulic hybrid vehicle systems include four main components: a hydraulic fluid, a fluid reservoir, a hydraulic pump/motor (in parallel hybrid systems) or in-wheel motors and pumps (in series hybrid systems), and a fluid accumulator. The pump/motor extracts kinetic energy during braking to pump the working fluid from the fluid reservoir to the fluid accumulator. Working fluid is thus pressurized. When the vehicle accelerates, this pressurized working fluid provides energy to the pump/motor to power the vehicle.

As is known, hydraulic pumps generate a substantial amount of noise. Unavoidable design imperfections of the components used in hydraulic pumps result in uneven flow characteristics and pressures waves that produce unwanted system noise. In additional, these uneven flow characteristics and pressure waves make the components vibrate. This vibration of system components also generates unwanted system noise. Higher pump flow rates lead to an increase in uneven flow characteristics, pressure waves, and system component vibration. Accordingly, higher pump flow rates generate a significant amount of unwanted hydraulic system noise.

SUMMARY

In one embodiment, the invention provides a speed-based system for controlling a pump displacement to control a pump flow rate of a hydraulic pump in a vehicle, such as a hybrid. The system includes a plurality of sensors, a controller, and a hydraulic pump. The controller is configured to receive data from the sensors, ascertain a speed of the vehicle, determine a target pump displacement, and transmit the target pump displacement. The target pump displacement is less than a predetermined maximum value when the speed of the vehicle is greater than a first predefined threshold, and equal to the predetermined maximum value when the speed of the vehicle is less than or equal to the first predefined threshold. The hydraulic pump is configured to ascertain an actual pump displacement, receive the target pump displacement from the controller, and alter the actual pump displacement to the target pump displacement.

In another embodiment, the invention provides speed-based method for controlling a pump displacement and a flow rate of a hydraulic pump in a vehicle, such as a hybrid, to reduce system noise. A controller receives sensor data from a plurality of sensors, including a speed of the vehicle. The controller determines a target pump displacement. The target pump displacement is less than a predetermined maximum value when the speed of the vehicle is greater than a first predefined threshold, and equal to the predetermined maximum value when the speed of the vehicle is less than or equal to the first predefined threshold. The controller transmits the target pump displacement to the hydraulic pump. The hydraulic pump alters an actual pump displacement to the target pump displacement.

In yet another embodiment, the invention provides an electronically implemented speed-based system for controlling a pump displacement to control a pump flow rate of a hydraulic pump in a vehicle, such as a hybrid. In this embodiment, the hydraulic pump is a variable displacement pump. The controller controls the pump displacement by altering the pump angle of a swashplate inside the variable displacement pump. This embodiment does not require any additional mechanical hardware to be employed such as hydraulic noise suppressors, control valves, or pump control plates.

Other embodiments and aspects of the invention will become apparent by consideration of the detailed description and accompanying drawings.

DETAILED DESCRIPTION

Figure 1:
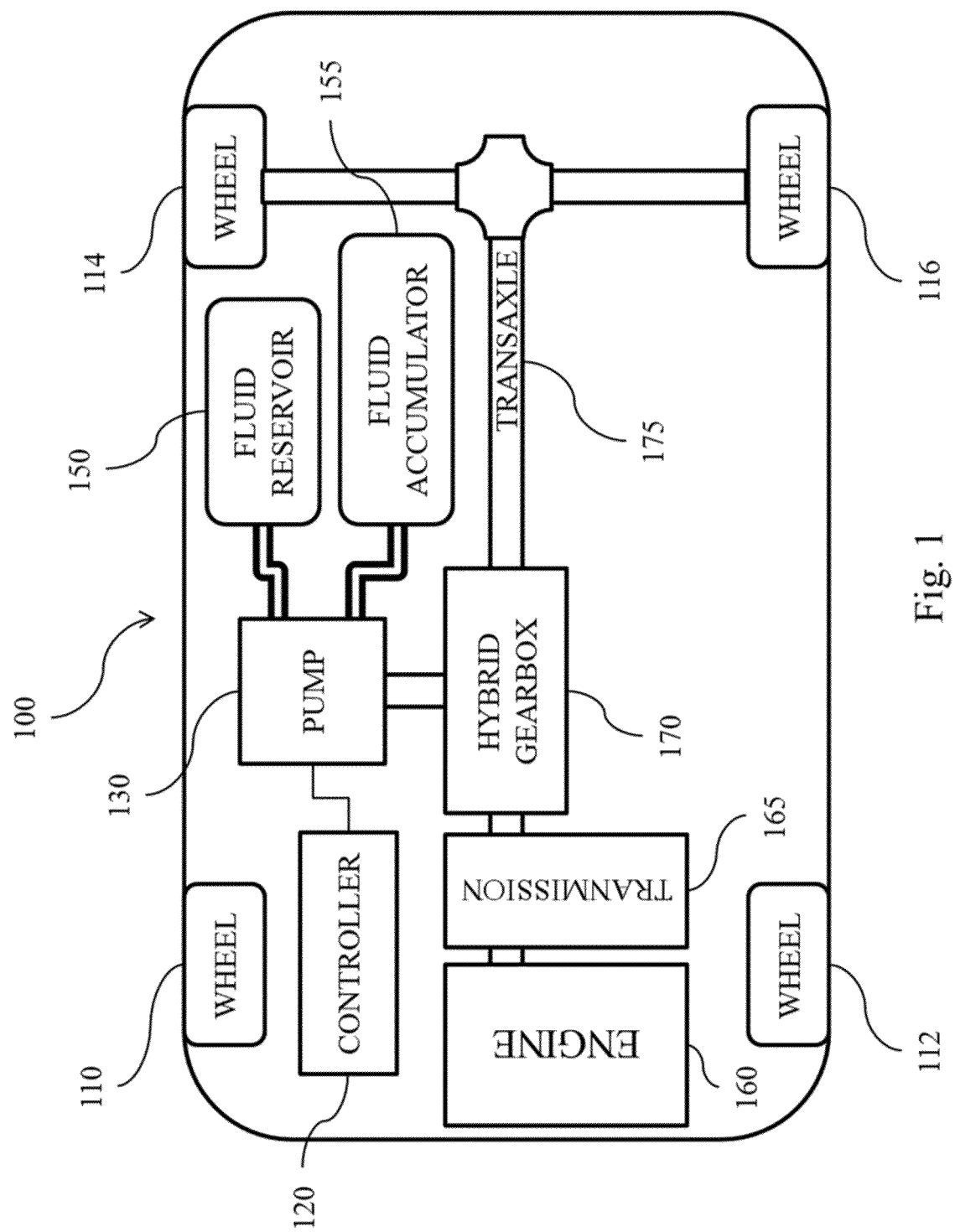
FIG. 1 is an illustration of a hydraulic hybrid system and vehicle layout.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention. Alternative configurations are possible.

FIG. 1 illustrates a vehicle 100. The vehicle 100 includes two front wheels 110 and 112, and two rear wheels 114 and 116. The vehicle 100 includes other components including a controller 120, a hydraulic pump 130, a fluid reservoir 150, a fluid accumulator 155, an engine 160, a transmission 165, a hybrid gearbox 170, and a transaxle 175. When the engine 160 stops supplying power and the vehicle 100 is moving, the vehicle 100 will slow down. As the vehicle 100 slows down, the rear wheels 114 and 116 rotate. The rear wheels 114 and 116 are connected to the transaxle 175 and the transaxle 175 also rotates. The transaxle 175 is connected to the hybrid gearbox 170. The hybrid gearbox 170 translates the rotating motion of the transaxle 175 to the hydraulic pump 130. In turn, the hydraulic pump 130 uses the rotating motion to pump fluid from the fluid reservoir 150 to the fluid accumulator 155. The controller 120 regulates the operation of the hydraulic pump 130.

Figure 2:
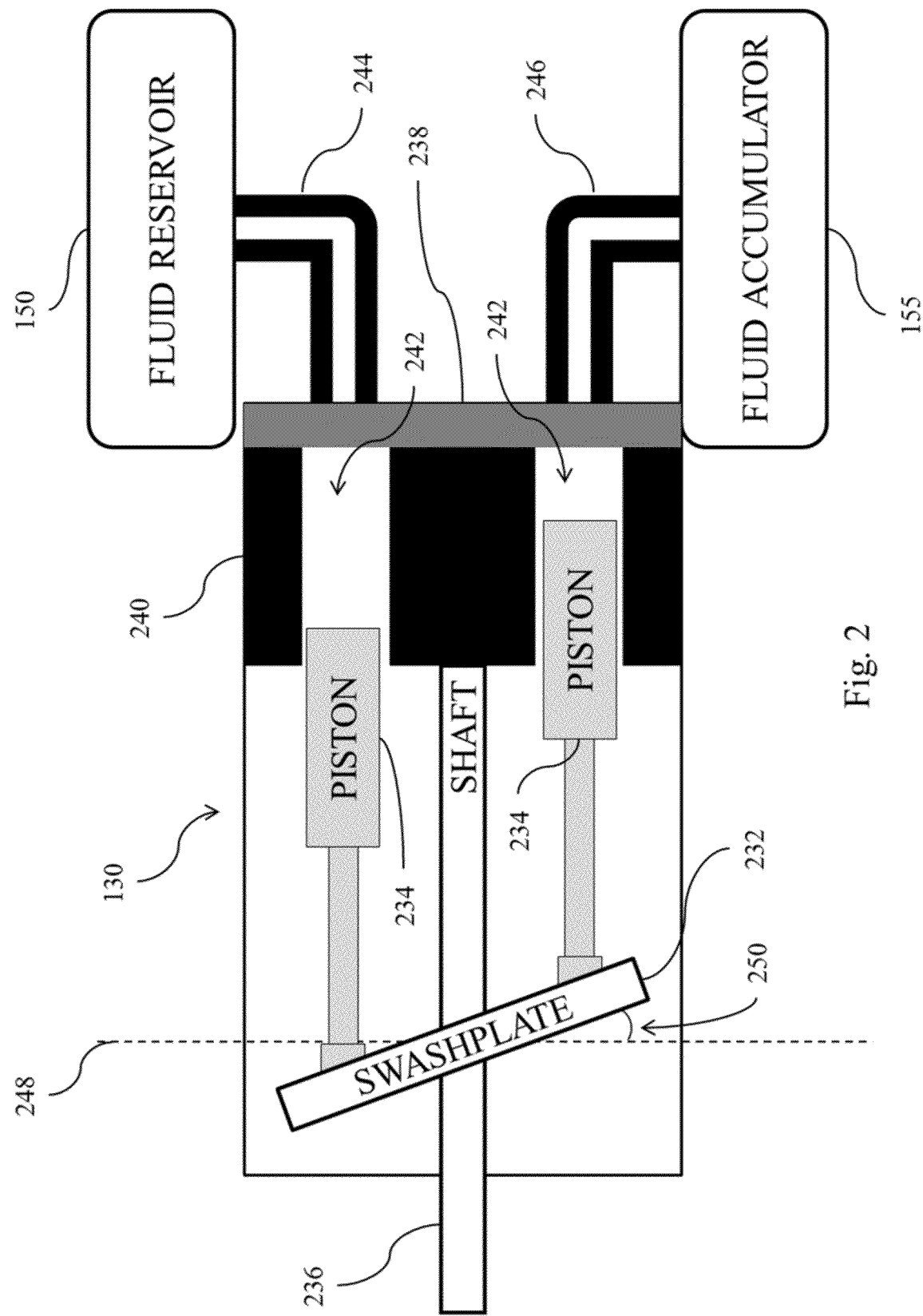
FIG. 2 is an illustration of a hydraulic displacement pump.

FIG. 2 illustrates a hydraulic pump 130 according to one embodiment of the invention, wherein the hydraulic pump 130 is a variable displacement pump. In the embodiment illustrated, the hydraulic pump 130 includes a swashplate 232, a plurality of pistons 234, a shaft 236, a rotary valve 238, and a cylinder block 240. The cylinder block 240, represented in FIG. 2 by the dark areas, includes a plurality of cylinders 242 that are arranged in parallel to the plurality of pistons 234. The cylinder block 240 is connected to the shaft 236 such that the cylinder block 240 and the plurality of cylinders 242 will rotate when the shaft 236 rotates. The swashplate 232 does not rotate. Therefore, as the plurality of pistons 234 rotate, the angle of the swashplate 232 causes the pistons 234 to move in and out of the plurality of cylinders 242. The rotary valve 238 alternately connects each of the plurality of cylinders 242 from the fluid supply line 244 and a fluid delivery line 246.

In one embodiment, each cylinder 242 is filled with low pressure fluid from the fluid reservoir 150 when it is attached to the fluid supply line 244. Each cylinder 242 expels high pressure fluid to the fluid accumulator 155 when it is attached to the fluid delivery line 246. A pump angle 250 is the angle between the swashplate 232 and an axis 248. By varying the pump angle 250, the stroke of the plurality of pistons 234 can be varied. If the swashplate 232 is perpendicular to the axis of rotation of the shaft 236 (i.e., pump angle 250 is zero degrees), no fluid will flow. On the other hand, if the swashplate 232 is at a sharp angle (i.e., pump angle 250 is 15 degrees), a large volume of fluid will flow.

A pump flow rate is the volume of fluid pumped through the system by a hydraulic pump 130 per unit time. In the variable displacement pump used in certain embodiments of the invention, the pump flow rate is determined by a pump speed and a pump displacement. Pump speed is the common rate of rotation of the shaft 236, the cylinder block 240, the plurality of cylinders 242, and the plurality of pistons 234. The pump speed is linearly related to the speed of the vehicle 100. Pump displacement, or the volume of fluid pumped per revolution of the shaft 236, is determined by pump angle 250. The larger the pump angle 250, the larger the pump displacement. Therefore, varying the pump angle 250 and/or the vehicle speed will affect the pump flow rate.

Figure 3:
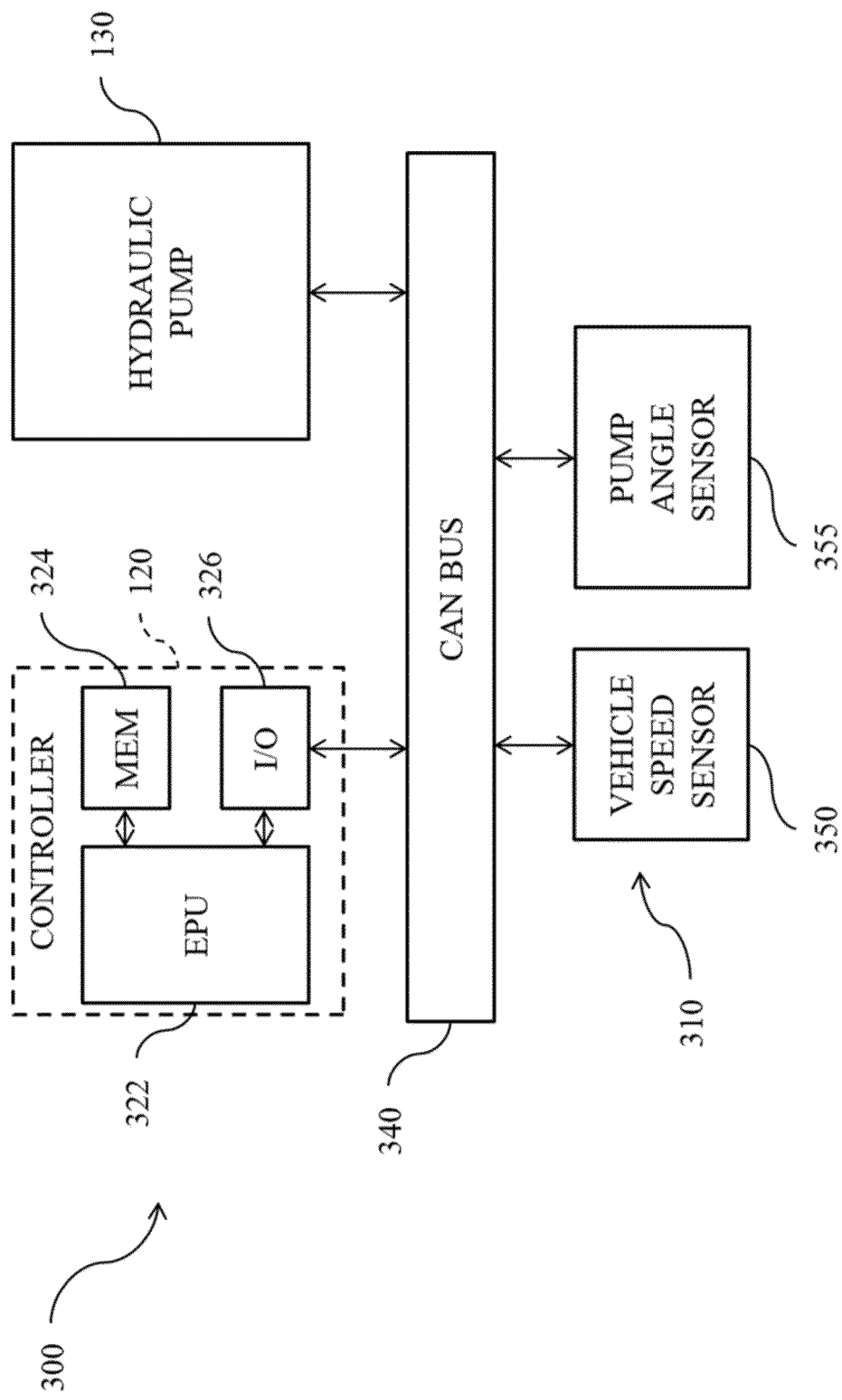
FIG. 3 is a schematic illustration of a hybrid hydraulic control system according to one embodiment.

FIG. 3 is a schematic illustration of a hydraulic pump system 300 according to one embodiment of the invention. The system 300 includes a controller 120, a hydraulic pump 130, and a plurality of sensors 310. In this embodiment, the hydraulic pump 130 is a variable displacement pump. In general terms, the controller 120 alters the pump displacement of the hydraulic pump 120 by controlling the pump angle 250. The controller 120 includes an electronic processing unit 322, a memory 324, and an input/output interface 326. The input/output interface 326 connects the controller 120 to external devices such as sensors. In one embodiment, the input/output interface 120 is connected to a controller area network ("CAN") bus 340. A CAN bus is a known vehicle network through which various vehicle systems can transmit and receive information. The controller 120 receives signals from the plurality of sensors 310. Also, the controller 120 receives and sends signals from the hydraulic pump 130. In one embodiment, communications between the controller 120, the sensors 310, and the hydraulic pump 130 occur over the CAN bus 340. However, it is possible to connect the sensors 310 and the hydraulic pump 130 (via wired or wireless connection) directly to the controller 120.

In this embodiment, the plurality of sensors 310 include: a vehicle speed sensor 350 and a pump angle sensor 355. The vehicle speed sensor 350 ascertains the current velocity of the vehicle 100. The pump angle sensor 355 measures the pump angle 250 of the swashplate.

Figure 4:
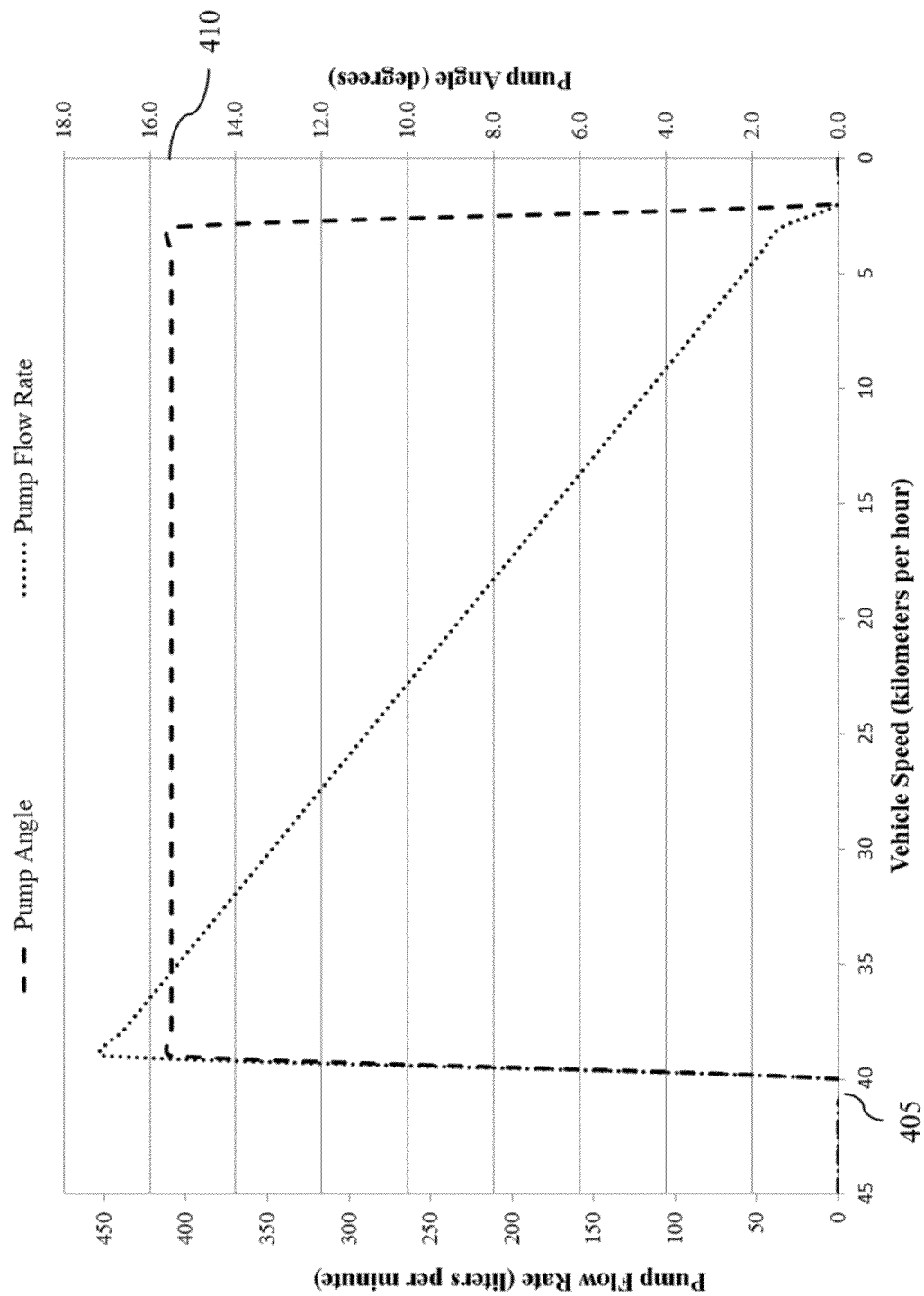
FIG. 4 is a graphical representation of a braking event wherein a control system disclosed in the prior-art is implemented.

FIG. 4 illustrates a braking event wherein controller logic is similar to that of prior-art technology (normal) is implemented. In FIG. 4, an exemplary braking event 405 occurs at a speed of approximately 40 kilometers per hour ("KPH"). With prior-art technology, the pump angle 250 changes rapidly from a low or zero value to a high value 410. Once the high value 410 is reached, the pump angle 250 remains relatively steady until the end of the braking event 405. Between approximately 40 KPH and 20 KPH the values of the pump flow rate are high. These high values of pump flow rate generate unwanted hydraulic system noise.

Figure 5:
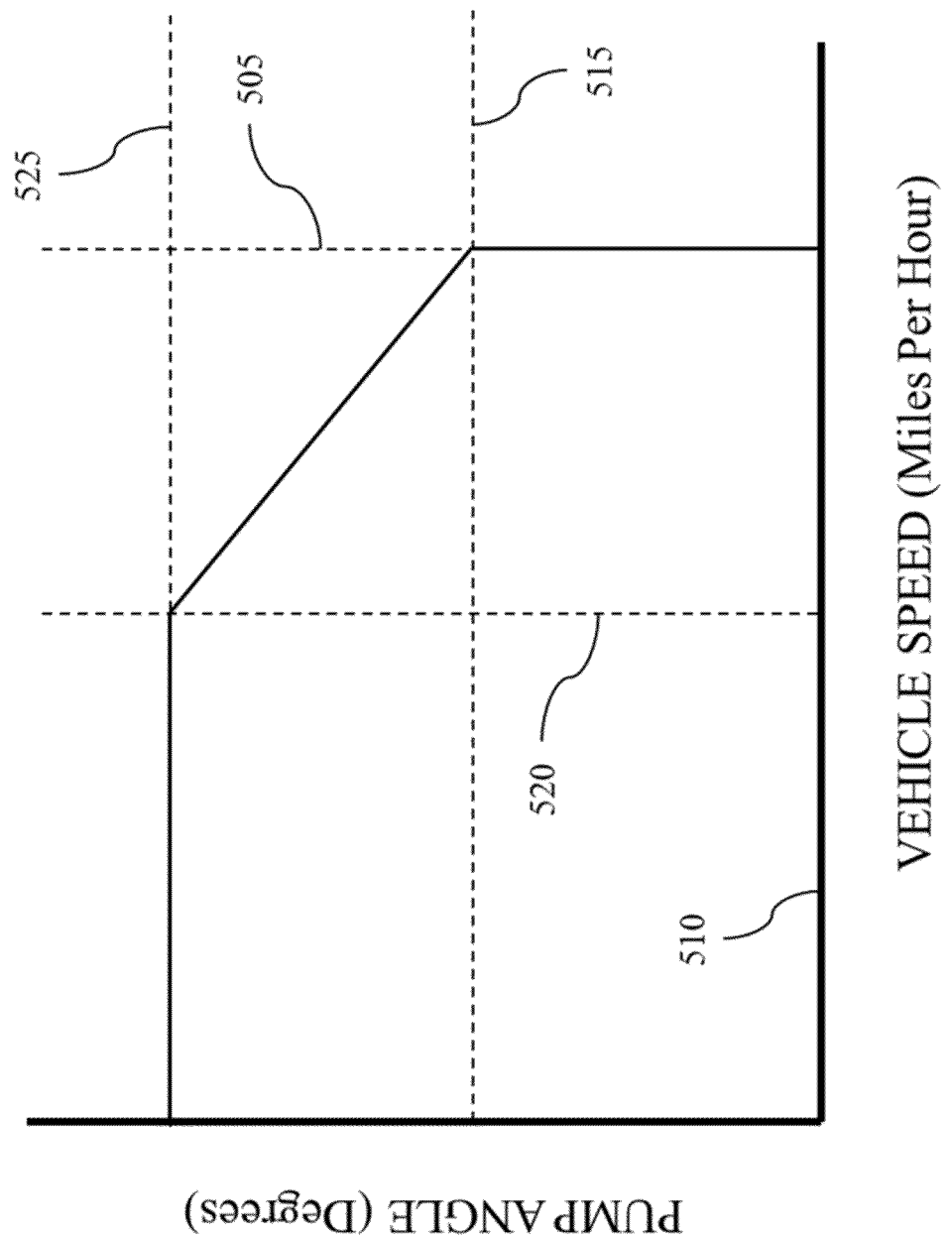
FIG. 5 is a graphical representation of the relationship between pump angle and vehicle speed implemented by the controller according to one embodiment.

FIG. 5 graphically illustrates one embodiment of logic implemented by the controller 120 with regard to pump angle 250 and vehicle speed. When the speed of the vehicle 100 is greater than a first predetermined threshold 505 (e.g., 25 miles per hour), the controller 120 commands the hydraulic pump 130 to set the pump angle 250 to a minimum value. When the speed of the vehicle 100 is equal to the first predetermined threshold 505, the controller 120 commands the hydraulic pump 130 to change the pump angle 250 to an offset value 515. When the speed of the vehicle 100 is less than the first predetermined threshold 505 as well as greater than a second predetermined threshold 520 (e.g., 15 miles per hour), the pump angle 250 increases from the offset value 515 in a linear fashion. When the speed of the vehicle 100 is less than or equal to the second predetermined threshold 520, the controller 120 commands the hydraulic pump 130 to set the pump angle 250 to a maximum value 525. It is to be understood that pump angle 250 can be replaced with pump displacement.

Figure 6:
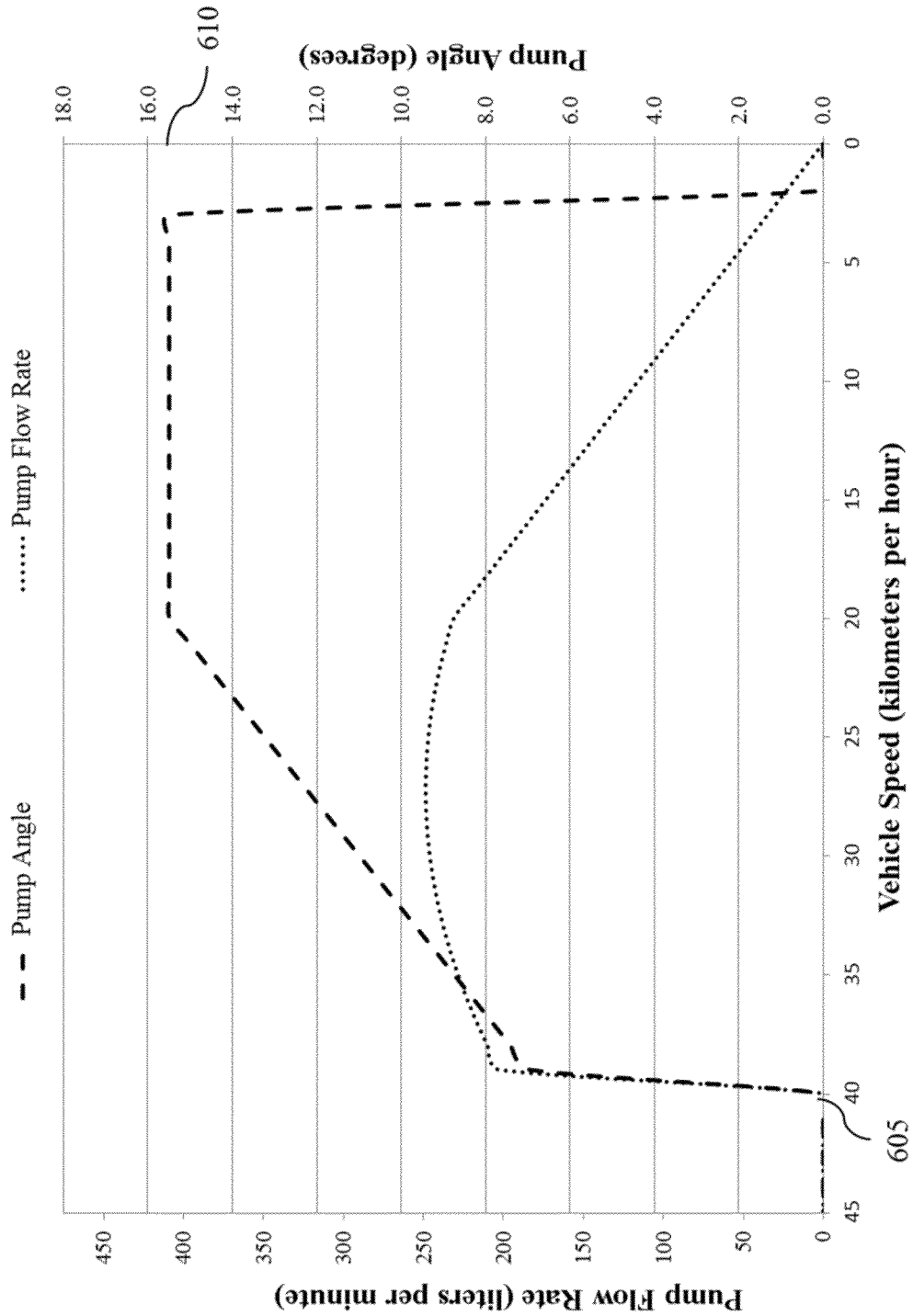
FIG. 6 is a graphical representation of a braking event wherein a control system according to one embodiment is implemented.

FIG. 6 illustrates a braking event, similar to FIG. 4, wherein controller logic similar to that in FIG. 5 is implemented. In FIG. 6, an exemplary braking event 605 occurs at a speed of approximately 40 KPH. Using the control techniques of embodiments of the invention, the pump angle 250 changes from a low or near zero value to about 7 degrees. As the speed of the vehicle 100 continues to decrease, the pump angle 250 increases in a linear fashion. When the speed of the vehicle 100 is approximately 20 KPH, the pump angle 250 remains steady at a high value 610. Finally, when the speed of the vehicle 100 approaches zero (i.e., end of the braking event 605), the pump angle 250 changes to a low or near zero value. By controlling the pump angle 250 throughout the braking event 605, the controller 120 limits the pump flow rate. Limiting the pump flow rate minimizes the generation of unwanted hydraulic system noise by the hydraulic pump 130.

It is to be understood that the logic implemented by the controller can also be used for acceleration events even though the above examples are braking events.

Thus, the invention provides, among other things, a speed-based control system for controlling hydraulic pump displacement to limit unwanted system noise. Various features and advantages of the invention are set forth in the following claims.

What is claimed is:

1. A speed-based system for controlling a pump displacement and a pump flow rate of a hydraulic pump in a vehicle, the system comprising:
 a plurality of sensors;
 a controller, the controller configured to
  receive data from the sensors,
  ascertain a speed of the vehicle,
  determine a target pump displacement, wherein the target pump displacement is
   less than a predetermined maximum value when the speed of the vehicle is greater than a first predefined threshold, and
   equal to the predetermined maximum value when the speed of the vehicle is less than or equal to the first predefined threshold, and
  transmit the target pump displacement; and
 a hydraulic pump, the hydraulic pump configured to
  ascertain an actual pump displacement,
  receive the target pump displacement from the controller, and
  alter the actual pump displacement to the target pump displacement.

2. The system of claim 1, wherein the relationship between target pump displacement and the speed of the vehicle is inversely linear when the speed of the vehicle is greater than the first predetermined threshold.

3. The system of claim 2, wherein the target pump displacement is a predetermined minimum value when the speed of the vehicle is greater than a second predetermined threshold.

4. The system of claim 3, wherein the target pump displacement is a predetermined offset value when the speed of the vehicle is equal to the second predetermined threshold.

5. The system of claim 1, wherein the plurality of sensors include a vehicle speed sensor.

6. The system of claim 1, wherein the hydraulic pump is a variable displacement pump.

7. The system of claim 6, wherein the target pump displacement is a target pump angle and the actual pump displacement is an actual pump angle.

8. The system of claim 6, wherein the plurality of sensors include a pump angle sensor.

9. A speed-based method for controlling a pump displacement and a flow rate of a hydraulic pump in a vehicle to reduce system noise, the method comprising:
 receiving, at a controller, sensor data, including a speed of the vehicle, from a plurality of sensors;
 determining, by the controller, a target pump displacement, wherein the target pump displacement is
  less than a predetermined maximum value when the speed of the vehicle is greater than a first predetermined threshold, and
  equal to the predetermined maximum value when the speed of the vehicle is less than or equal to the first predetermined threshold;
 transmitting, by the controller, the target pump displacement to the hydraulic pump; and
 altering an actual pump displacement of the hydraulic pump to the target pump displacement.

10. The method of claim 9, wherein the relationship between target pump displacement and the speed of the vehicle is inversely linear when the speed of the vehicle is greater than the first predetermined threshold.

11. The method of claim 10, wherein the target pump displacement is a predetermined minimum value when the speed of the vehicle is greater than a second predetermined threshold.

12. The method of claim 11, wherein the target pump displacement is a predetermined offset value when the speed of the vehicle is equal to the second predetermined threshold.

13. The method of claim 9, wherein the plurality of sensors include a vehicle speed sensor.

14. The method of claim 9, wherein the hydraulic pump is a variable displacement pump.

15. The method of claim 14, wherein the target pump displacement is a target pump angle and the actual pump displacement is an actual pump angle.

16. The method of claim 14, wherein the plurality of sensors include a pump angle sensor.

\* \* \* \* \*